United States Patent
Breen et al.

(10) Patent No.: US 7,313,497 B2
(45) Date of Patent: Dec. 25, 2007

(54) VALVE MONITORING METHOD AND ARRANGEMENT

(75) Inventors: Donnelly Breen, Victoria (AU); Andrew Meehan, Victoria (AU); Bradley Reid, Victoria (AU)

(73) Assignee: Monatec Pty Ltd., Victoria (AU)

( * ) Notice: Subject to any disclaimer, the term of this patent is extended or adjusted under 35 U.S.C. 154(b) by 264 days.

(21) Appl. No.: 11/241,365

(22) Filed: Sep. 30, 2005

(65) Prior Publication Data

US 2006/0111875 A1    May 25, 2006

(30) Foreign Application Priority Data

| Apr. 1, 2003 | (AU) | ................ 2003901475 |
| Apr. 1, 2003 | (AU) | ................ 2003901476 |
| Apr. 1, 2004 | (WO) | ............... PCT/AU04/00421 |

(51) Int. Cl.
*G06F 19/00* (2006.01)

(52) U.S. Cl. ........................ 702/114; 73/1.72

(58) Field of Classification Search ............... 702/114, 702/182, 185; 73/1.57, 1.59, 1.71, 1.72
See application file for complete search history.

(56) References Cited

U.S. PATENT DOCUMENTS

| 4,892,114 | A | | 1/1990 | Maroney et al. |
| 5,226,447 | A | | 7/1993 | Burley |
| 5,237,310 | A | * | 8/1993 | Smith ...................... 340/679 |
| 5,261,437 | A | | 11/1993 | Kalix |
| 5,379,792 | A | | 1/1995 | Van Becelaere |
| 5,772,403 | A | * | 6/1998 | Allison et al. ............. 417/44.2 |
| 6,629,447 | B1 | * | 10/2003 | Collins ...................... 73/1.16 |
| 2003/0192595 | A1 | | 10/2003 | Benson |

FOREIGN PATENT DOCUMENTS

| EP | 1130302 | 9/2001 |
| JP | 10-184986 | 7/1998 |
| JP | 2001-027555 | 1/2001 |
| JP | 2002-130523 | 5/2002 |
| JP | 2002-159585 | 6/2002 |
| JP | 2003-240145 | 8/2003 |
| WO | WO 1992/015768 | 9/1992 |
| WO | WO 1997/021984 | 6/1997 |
| WO | WO 1999/000619 | 1/1999 |
| WO | WO 2000/011531 | 3/2000 |
| WO | WO 2001/013191 | 2/2001 |
| WO | WO 2001/021989 | 3/2001 |

* cited by examiner

*Primary Examiner*—Edward Raymond
(74) *Attorney, Agent, or Firm*—Inskeep IP Group, Inc.

(57) ABSTRACT

A method and apparatus or arrangement, for monitoring the operating characteristics of valves, principally to monitor for failure of a valve. The method including measuring a pressure differential across a valve 1 and comparing the measured differential with a required differential. If the measured differential is acceptable relative to the required differential, the valve is deemed to be operating acceptably. If the differential is not acceptable relative to the required differential, then further monitoring in the form of flow sensing takes place and is compared relative to required flow characteristics. The method employs a comparison of the pressure differential and the sensed flow characteristics to determine whether the valve is operating acceptably.

19 Claims, 5 Drawing Sheets

$P_{\grave{e}}$ = lift value for valve 8
$P_{\varsigma}$ = lift value for valve 9
$P_{\grave{e}} \ll P_{\varsigma}$

Figure 5

VALVE MONITORING METHOD AND ARRANGEMENT

CROSS-REFERENCE TO RELATED APPLICATIONS

This invention is related to and claims priority from Australian Patent Application Nos. 2003901475, filed Apr. 1, 2003, entitled Valve Monitor; 2003901476, filed Apr. 1, 2003, entitled Backflow Monitor; and PCT Application No. PCT/AU2004/000421, filed Apr. 1, 2004, entitled Valve Monitoring Method And Arrangement, which are all incorporated herein by reference.

FIELD OF THE INVENTION

The present invention relates, to a method and arrangement for monitoring valves, in particular to monitor for symptoms indicating failure or incipient failure of proper valve operation. The method and arrangement of the present invention have been developed principally in relation to back flow valves for safety purposes, in order to ensure that failure, or incipient failure of a backflow valve can be identified early and corrective action taken. It will therefore be convenient to describe the invention in relation to back flow valves, although it should be appreciated that the invention can be applied to many other forms of valves in which early identification of valve failure is advantageous.

BACKGROUND

Backflow valves are forms or assemblies of check or one-way valves, and operate to allow relatively unimpeded flow in one direction through the valve, and to prevent flow through the valve in the reverse or opposite direction. Backflow prevention usually is desirable in order to prevent contamination of the source of fluid which enters the valve from upstream. A valve which is typically employed in or as a back flow valve, includes a flap which is movable between an open position and a closed position. In the open position, the flap allows fluid to flow through the valve, but in the closed position, the flap presses a resilient seal against a valve seat to prevent flow. Valves of this kind can fail and therefore allow flow of fluid through the valve in the reverse direction for example, in circumstances in which corrosion and/or abrasion has caused the seal or valve seat to be damaged, so that a sufficient seal engagement does not occur in the closed flap position. Failure can alternatively occur by way of foreign matter becoming lodged between the seal and the valve seat, and even though the foreign matter may become dislodged by flow of fluid through the valve, permanent damage may have occurred to either the seal or the valve seat so that reverse flow of fluid through the valve continues.

If failure of a backflow valve occurs, the fluid source can be contaminated by additives downstream of the back flow valve, such as acids, detergents, solvents, sewerage, etc. Given the seriousness of contamination, backflow valves typically incorporate a pair of check or one-way valves which are aligned to allow flow therethrough in one direction, but not in the reverse. Two check or one-way valves are provided so that upon failure of one of those valves, the other maintains protection against backflow contamination.

A further feature of one type of backflow valve, is the presence of a relief valve, inserted between the two check or one-way valves. Such a valve is known in the art as a reduced pressure zone valve or assembly. In this arrangement, the assembly operates so that when a first of the check or one-way valves has a sufficient pressure differential, that differential is employed, generally through a diaphragm, to maintain the relief valve closed. As the differential pressure reduces and the diaphragm is unable to maintain the relief valve closed, back flowing fluid is dumped through the relief valve typically to atmosphere. This serves two purposes, the first of which is that the backflowing fluid is prevented from backflowing past the check or one-way valve, and further, personnel are alerted to a potential problem by the fluid being dumped through the relief valve.

The critical nature of backflow valves, is such that many countries have legislative regulations, that require periodic monitoring of such valves to ensure their fail-safe operation. Typically this involves an annual certification process, which requires a skilled operator to connect hydraulic monitoring equipment to the backflow valve and to isolate the valve from the reticulation network. U.S. Pat. No. 5,713,240 (Engelmann), discloses a method that allows certification to be carried out remotely, but the process disclosed by Engelmann requires fluid flow through a pipe containing the valve to have an effective zero flow rate. Also, Engelmann is deficient in being unable to check the proper operation of a backflow valve, when the valve experiences a back pressure, reverse to the normal direction of pressure through the valve. Therefore, while Engelmann discloses an arrangement which does not necessarily require attendance of a skilled operator at the actual backflow valve and which can further test a valve without requiring the pipe to be disconnected from the reticulation network, the disclosed arrangements nevertheless do not allow for monitoring to take place under all circumstances.

SUMMARY OF THE INVENTION

According to the present invention there is provided a method of monitoring for acceptable operation of a valve, said method comprising:

employing means to establish whether upstream fluid pressure of the valve differs from the downstream pressure by a required pressure differential, whereby if the upstream fluid pressure differs from the downstream pressure by the required pressure differential, the valve is deemed to be operating acceptably and further monitoring is terminated, whereby if the upstream fluid pressure differs from the downstream pressure by an amount other than the required differential, further monitoring is completed, the further monitoring comprising:

sensing fluid flow relative to the valve and relative to required flow parameters, whereby if sensed flow is acceptable relative to the required flow parameters, the valve is deemed to be operating acceptably, whereby if sensed flow is unacceptable relative to the required flow parameters, the valve is deemed to be operating unacceptably and a valve failure signal is generated.

The means to establish whether the upstream pressure of the valve differs from the downstream pressure can take any suitable form and can for example comprise a pressure sensor which communicates with each of the upstream and downstream sides of the valve. The pressure sensor can take the form of a differential pressure sensor or switch, or a mechanical device which reacts to differential pressure. Alternatively, in a preferred arrangement, a one-way or check valve is disposed in a fluid line which communicates with each of the upstream and downstream sides of the valve and that check valve is rated so that when the upstream pressure is at the required pressure differential, the valve allows fluid flow therethrough. On the other hand, when the upstream pressure differs from the downstream pressure an amount other than the required differential, flow through the check valve is prevented.

In the above arrangement, the required pressure differential can be equal to a minimum differential pressure amount or above. For example, it may be that the fluid line check valve described above has a lift value of 2 psi so that a pressure differential or 2 psi or above, i.e. without an upper limit, facilitates flow through the check valve. Conversely, if the pressure differential is an amount below 2 psi, then the required pressure differential will not have been reached and according to the above method, further monitoring to determine the acceptable operation or otherwise of the valve is required. As described, that further monitoring comprises sensing flow characteristics and in one arrangement, a flow sensor is disposed upstream of the valve, and upstream flow is sensed and/or measured and in combination with the results relating to the comparison of the upstream and downstream pressure, an assessment is made as to the likelihood of whether a backflow through the valve is occurring. In one arrangement, if the differential pressure is other than as required, so that, for example, the upstream fluid pressure is not sufficiently greater than a downstream fluid pressure and if a flow of fluid is detected by the flow sensor, a backflow through the valve may be occurring. In that instance, a failure signal is generated.

In alternative circumstances, if the fluid pressure differential is other than the required pressure differential, for example if the upstream and downstream fluid pressures are substantially equal, and additionally if the flow sensor senses substantially no fluid flow, then the possibility is that the device to which the valve is fitted has been disconnected from its fluid supply. Under these circumstances, the method of the invention could be arranged to initiate a failure signal, or alternatively, could retest the valve after a short delay, to establish whether a repeat of that result is achieved.

In a third alternative circumstance, if the fluid pressure differential is other than the required differential, for example that the downstream pressure exceeds the upstream pressure, and the flow sensor detects a flow, then there is a high likelihood that a backflow is occurring through the valve.

It will be appreciated that the above discussion principally concerns a determination as to whether backflow is occurring in a one-way valve, a check valve, or a backflow prevention valve. It will be appreciated however, that a monitoring method of the invention is operable to test for other qualities of valve operation, such as for leakage of flow in either direction and for confirming that particular flow or pressure ratings of valves are maintained over the life of the valve. The invention can therefore apply also to control valves of various kinds such as pressure reduction valves, pressure sustaining valves, modulating valves, flow control and shut-off valves.

Accordingly, the invention can be employed to monitor valves generally and in one embodiment, the invention provides a method of monitoring for acceptable operation of a valve, the method comprising:

measuring pressure differential across a valve, comparing the measured pressure differential with an acceptable pressure differential, whereby if the measured pressure differential is acceptable relative to the acceptable pressure differential, the valve is deemed to be operating acceptably and further monitoring is terminated, whereby if the measured pressure differential is unacceptable relative to the acceptable pressure differential, further monitoring is completed, the further monitoring comprising:

sensing actual fluid flow between one or both of upstream and downstream sides of the valve and comparing that flow to acceptable flow parameters, whereby if the actual flow is acceptable relative to the acceptable flow parameters the valve is deemed to be operating acceptably and further monitoring is terminated, whereby if the actual flow is unacceptable relative to the acceptable flow parameters, the valve is deemed to be operating unacceptably and a failure signal is produced.

In the above arrangement, the method step of measuring the pressure differential across a valve can be made in a fluid line that connects to each of the upstream and downstream sides of a valve and in this respect, it typically is the case that a valve will be positioned in a pipeline, or in a neck, or generally in an enclosed region in which a flow of liquid or gas takes place. The valve typically operates to completely shut such flow, or to temper or throttle the flow a desired amount. For example, a pressure reduction valve is employed in a pipeline, to reduce the pressure of fluid within the pipeline from the upstream side of the valve to the downstream. Likewise, valves can be employed to reduce the velocity of fluid flow or to terminate flow when flow is not required. The fluid line described above, is also known as a bypass line, which is open to the upstream and downstream sides of the valve, and a measuring device disposed in such a bypass line can measure the pressure differential across the valve. A suitable measuring device can be a flow rate or flow indication device which is either electrical or mechanical.

In the method of the invention for monitoring a valve, if the differential across the valve as measured by the measuring device, meets the required pressure differential, then the valve can be assessed to be operating acceptably. Thus, a test is completed successfully and without further monitoring required. However, if the required pressure differential is not achieved, then further monitoring is necessary, to determine whether the absence of the required pressure differential represents that the valve is operating unacceptably, or whether there is an acceptable reason as to why the required pressure differential is not achieved. Accordingly, a calculation of fluid flow is made and combined with the results of pressure differential measurement, and the outcome analysed by a suitable processor, after which the decision of the acceptable or unacceptable operation of the valve can be made.

Preferably a flow sensor is in communication with the upstream side of the valve. If the valve is located in a pipeline, then the valve sensor can be connected to the pipeline, to communicate with the interior of the pipeline, preferably reasonably close to the valve location. The valve sensor can take any suitable form and for example can include take any of the forms discussed earlier.

In the method of the invention, the bypass line can include valves, preferably solenoid operated valves, which can be opened and closed as necessary. In one arrangement, a first valve is positioned in the bypass line, between the pressure differential sensor and the downstream side of the first valve. This valve is normally open, to allow downstream pressure exposure to the pressure sensor. A second valve may be positioned in a further bypass line section, in parallel with the pressure sensor, and that valve normally would be closed. By this arrangement, where an unacceptable pressure differential is sensed by the pressure sensor, the arrangement can be "zeroed" to ensure that the pressure sensor is not providing an inaccurate reading. To do this, the first open valve is closed, while the second closed valve is opened. This establishes equal pressure on either side of the pressure sensor to correct any off-zero setting in the pressure sensor.

Following the above process to zero the pressure sensor, the first bypass line valve is reopened, and the second bypass line valve is closed and a further pressure sensor reading taken. If the new reading confirms a pressure differential which is acceptable, then the monitoring process is complete. If however the earlier unacceptable result is again achieved, then by combining that reading with the subsequent readings of the flow sensor, and by processing those readings at the processor, a decision on the proper operation of the valve can be made.

Further additions to the method of the invention, are to include a further absolute pressure sensor, in communication with the upstream side of the valve, in order to monitor absolute supply pressure. When the supply pressure exceeds unusually high or low pressures, then the processor can be arranged to generate a failure or alarm signal. A relief valve may be included also, so that when a backflow pressure is experienced, which is or may lead to backflow through the valve, the processor may cause the relief valve to open to discharge fluid from the downstream side of the valve and to therefore lower the downstream pressure and prevent backflow occurring.

The invention can advantageously be applied specifically for use with backflow valves, in which a pair of one-way or check valves are provided for backflow prevention, and in this particular embodiment, the invention provides a method for monitoring for acceptable operation of a backflow valve, the method comprising:

applying a fluid line which is in communication with upstream and downstream sides of the backflow valve and which includes an outlet which is selectively openable, the fluid line including a one-way valve and a flow sensor between the upstream side of the backflow valve and the fluid line one-way valve, sensing flow through the fluid line and if flow above a set minimum flow is detected, the backflow valve is deemed to be operating acceptably and further monitoring is terminated, whereby if the flow sensor detects flow below the set minimum, the outlet is opened by a control arrangement and flow sensors detect flow through the fluid line on either of the upstream and downstream sides of the fluid line one-way valve and sensed flow direction is employed to determine whether a backflow through the backflow valve is occurring.

In the above method, a fluid line is disposed in communication with upstream and downstream sides of a first one-way valve of the backflow valve, and disposed within the fluid line, is a one-way valve and a flow sensor between the upstream side of the backflow valve and the one-way valve, and preferably also between the downstream side of the backflow valve and the one-way valve. Preferably, a flow restrictor is also disposed in the bypass line, preferably between the downstream side of the backflow valve and the one-way valve, and further preferably between the flow sensor and the downstream side of the backflow valve.

The bypass line is further preferably connected to atmosphere, through a further valve arrangement, and preferably that valve arrangement comprises at least two further valves, one of those valves being a one-way valve, and the second being a controllable valve. In this respect, the one-way valve is a rated valve, which opens when exposed to a particular upstream pressure, while the controllable valve is one which is selectively openable or closable by processor control. In this arrangement, the one-way valve is connected between the controllable valve and the connection to the bypass line.

In this embodiment of the invention, when the first flow sensor senses positive flow through the bypass line, that means that the pressure differential across the first backflow one-way valve is greater than the lifting pressure of the first bypass line valve. On the basis that the first bypass line valve is rated at a lifting pressure which represents the required pressure differential across the first backflow one-way valve, the backflow valve has met its monitoring requirements and further monitoring is unnecessary.

If however the first flow sensor senses a flow value which can be considered as zero, then the pressure differential across the first backflow one-way valve is less than the lifting pressure of the first bypass line valve. Accordingly, a potential backflow problem exists. In the preferred embodiment of this aspect of the invention, a controlled valve is opened, to promote flow through the bypass line and that flow can come from either the upstream or downstream sides of the backflow valve. Again, the first flow sensor reads flow through the bypass line and if flow is detected, the outcome can be decided that the upstream valve pressure is greater than the downstream valve pressure. Also, with flow detected by the first flow sensor, if a second one-way valve is provided between the bypass line and the controlled valve, the downstream pressure of the backflow valve can be considered to be greater than the lifting pressure of that second one-way valve. Again, this represents an acceptable operation of the first backflow one-way valve. In the event that the first flow sensor detects zero flow, then this represents a potential backflow problem, and further monitoring is required. Accordingly, readings are now taken by the second bypass line flow sensor and if that flow sensor senses zero flow, then the downstream valve pressure must be less than the lifting pressure of the second bypass line one-way valve. Such an outcome indicates that the main supply pressure has been lost or severely reduced and one possible reaction to that outcome, is to shut the controlled valve and to initiate a suitable failure signal.

If the second flow sensor senses fluid flow, at the same time that the first flow sensor senses zero flow, the first and second bypass line one-way valves are respectively closed and opened. This indicates that the second backflow one-way valve is experiencing reverse or backflow, and therefore the controllable valve is closed and a failure signal initiated.

The above methods provide for monitoring of valves in general and in particular backflow valves. Advantageously, by processing the valve monitoring, the results of tests can be recorded over time and analysed as required. In particular, the processor can be arranged to detect gradual deterioration in the performance of the valve and to remotely alert suitable personnel. The processor can transmit data through any suitable electronic or telecommunication arrangements, such as short-hop radio signals, optical telephone or other data transmission networks to a central computer that may receive data from a plurality of processors.

It should be appreciated that the main use of the invention is envisaged to be in relation to water supply networks, although it is not restricted to such networks. Accordingly, the invention can apply to any appropriate flow systems in which the flow medium is a gas or liquid.

A feature of the invention is that monitoring can take place continuously whereby the word "continuously" is used relative to the current typical monitoring regimes of annual test procedures. Continuously therefore can mean that a test is carried out say on a monthly, weekly or daily basis, or even more regularly, such as hourly or by the minute. Advantageously, this significantly improves the likelihood of detecting deterioration or failure that otherwise will not be detected for up to one year. Thus, the word "continuously", should be understood as incorporating intermittent monitoring on a relatively constant or regular basis. Indeed monitoring could be continuous in as much as one test could immediately follow another, but that requires a suitable power to be provided for the various sensing devices and for remotely located valves, that may be inappropriate. The monitoring arrangements for such valves may be battery operated, and if monitoring takes place on too regular basis, then battery power drain may leave the arrangement unpowered.

For a better understanding of the invention and to show how the same may be carried into effect, a preferred embodiment thereof will now be described, by way of non-limiting example only, with reference to the accompanying drawings.

DETAILED DESCRIPTION

Figure 1:
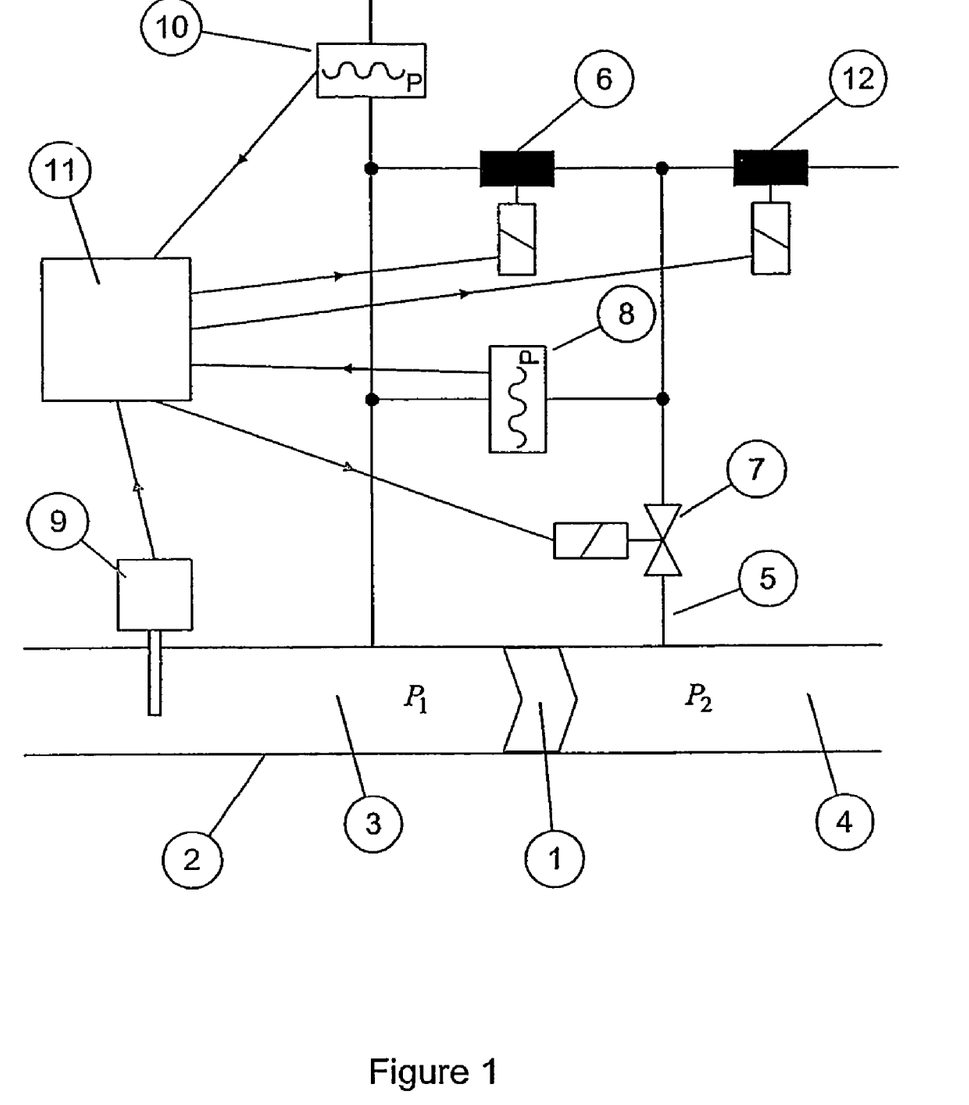
FIG. 1 is a diagrammatic representation of a valve monitoring arrangement in accordance with one aspect of the invention.
Figure 2:
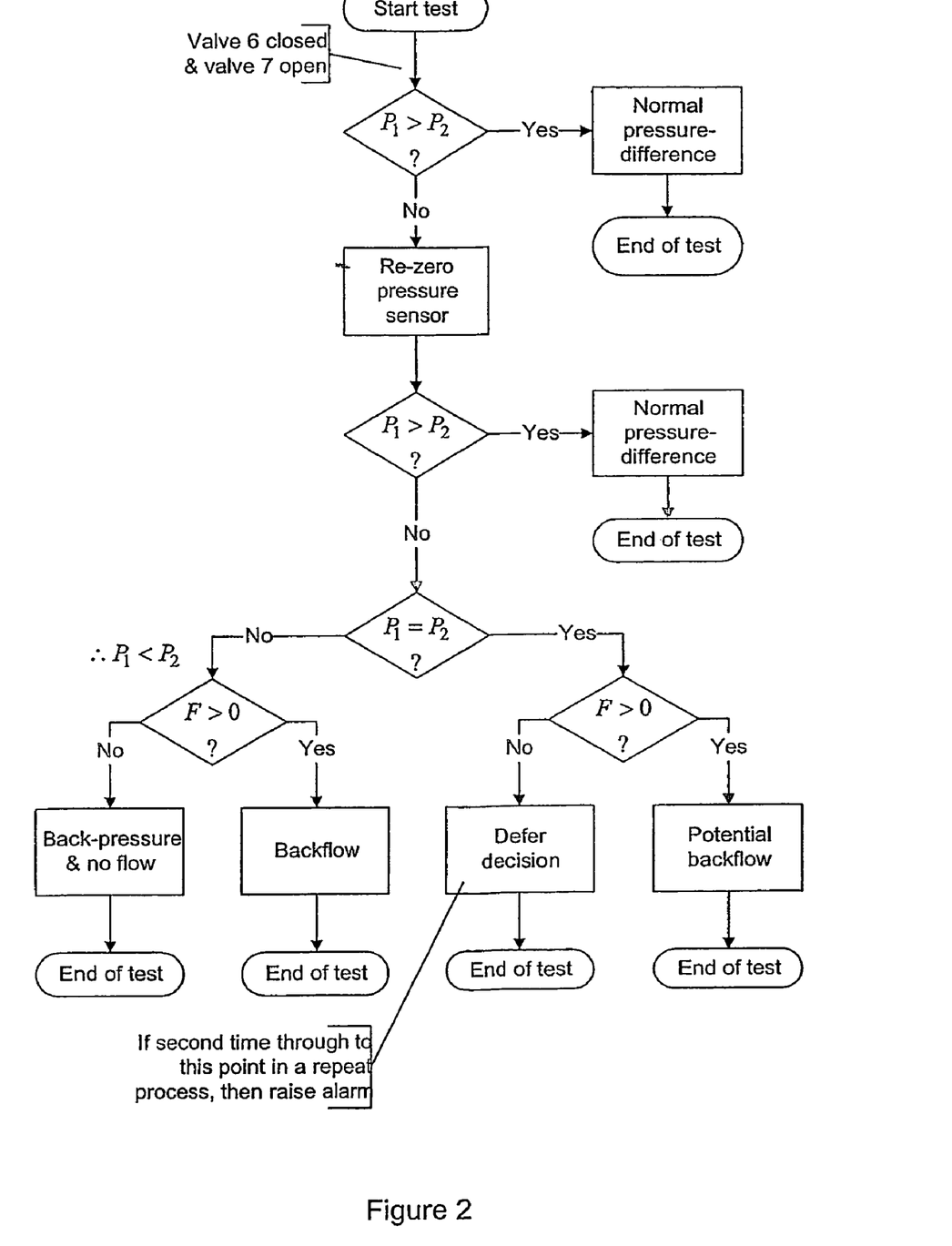
FIG. 2 is a flowchart which represents a monitoring procedure in accordance with the arrangement of FIG. 1.

In relation to FIGS. 1 and 2, a main pipe 2 is shown which incorporates a single valve 1. The valve 1 separates the upstream or inlet end 3 of the pipe 2 from the downstream or outlet end 4.

Pressures in these two regions are denoted by $P_1$ and $P_2$. Under normal and acceptable conditions of operation, there is a differential pressure across the valve.

A bypass line 5, containing solenoid-operated valves 6 (normally closed) and 7 (normally-open), is connected to ports in the upstream and downstream pipe regions. A pressure sensor 8 measures the pressure-difference across the valve-element 1. A flow-sensor 9 detects the flow in the main pipe.

A controller 11 (a microcontroller, processor or similar logical machine) controls the solenoid valves 6 and 7 and receives the flow-sensor and differential-pressure sensor outputs.

In the following explanation of the invention when applied to a single check-valve 1, a zero flow is to be taken as meaning a negligible detected level of flow, taking account of possible offsets and drifts in the flow sensor. A zero pressure-difference is to be taken as meaning a negligible detected level of pressure-difference, taking account of the practical limitations of the pressure-sensor. This applies also to the entire disclosure herein.

The operation of the invention can be understood as follows, making reference to the flow-chart in FIG. 2. The primary measurement is of differential pressure, with valve 6 closed and valve 7 open. If the upstream pressure at 3 exceeds the downstream pressure at 4, the valve-element 1 is maintaining a differential pressure in the normal sense. In this case the valve element 1 is considered to be operating normally.

If the downstream pressure at the downstream port 4 exceeds the upstream pressure at the upstream port 3, or is equal to it, the zero-setting of the differential pressure sensor 8 is confirmed or corrected, and a second phase of measurement is undertaken.

The process for re-zeroing the flow sensor is to close valve 7 and open valve 6, which provides for equal pressures on each side of the sensor. Any offset in the sensor output can be stored in the controller 11 and subtracted from subsequent readings. After zero-correction the valves are restored to their normal state: valve 6 closed and valve 7 open.

The differential pressure is re-measured with the freshly-zeroed pressure sensor 8, and the flow is also measured using sensor 9. The task of controller 11 is to run a sequence of measurements, raising a failure signal, such as an alarm if backflow is detected. If the results are inconclusive, the controller defers its decision until further evidence is available. Several scenarios are possible, as discussed below.

a. If the differential pressure is still zero and flow is non-zero, the valve element is not sustaining its expected pressure-drop, and that indicates backflow may be occurring. This is one condition the monitor is designed to detect, so an alarm is raised.

b. If the pressure-differential and flow are both zero, this indicates that the valve element is not sustaining its pressure-drop, and combined with the zero flow input, this indicates that the device may be disconnected from the supply in this case, the valve monitor would implement a programmed retry sequence, and raise an alarm if the results are confirmed over some definable period.

c. If the pressure-differential is negative, meaning that the downstream pressure exceeds the upstream pressure, and the flow is non-zero, backflow is occurring, and an alarm is raised.

d. If the pressure-differential is negative and the flow is zero, no backflow is occurring. As far as the valve-element 1 is concerned, this is normal behaviour under back-pressure conditions, so the test is completed successfully. In some applications an alarm might need to be raised because the back-pressure condition itself is regarded as a fault: for example, it may indicate loss of main supply pressure.

Figure 3:
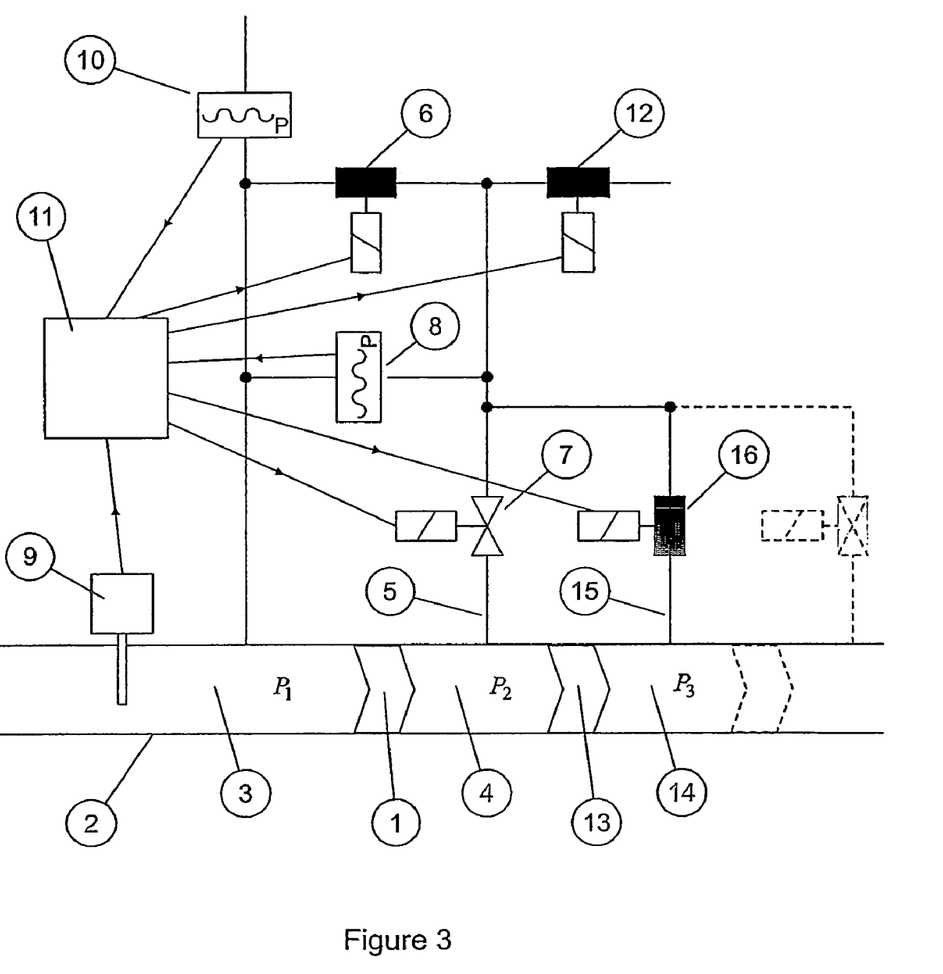
FIG. 3 is a diagrammatic representation of a valve monitoring arrangement in accordance with a second aspect of the invention.

The invention disclosed here can further allow two or more series-connected valve-elements to be monitored. The solid-line parts of FIG. 3 show valves 1 and 13. It will be evident that most of FIG. 3 is the same as FIG. 1, and that the same numbering is used for the common items. Valve 13 is to be monitored, in addition to valve 1. Another bypass line 15 and a normally-closed solenoid valve 16 are added for this purpose.

The operation of the valve monitor can be understood as follows. A primary measurement is made of differential pressure across valve-element 1, with valve 6 closed and valve 7 open. Another primary measurement is made of differential pressure across valve-elements 1 and 13, with solenoid-valve 7 closed and solenoid-valve 16 open. This enables the differential pressure across valve 13 to be deduced. Therefore the sequence of measurements and deductions described earlier in connection with FIG. 1 can be applied to each valve in the hydraulic system in FIG. 3. The dashed-line components of FIG. 3 show how additional series-connected valves may be monitored with the provision of one normally-closed solenoid valve for each additional valve in the main pipe.

Further it can be appreciated that the invention can be applied to the assessment of different types of valves. The valve need only meet one requirement, that it have a pressure differential across it, which provides a means of establishing the satisfactory or otherwise performance of the valve.

Using this principle, the valve can be a check valve, a pressure control element, or any hydraulic element meeting the above stated criterion of having a pressure differential across it which allows the establishment of an element or system performance.

The controller 11 is programmed with logic, to allow assessment of specific valves and provide application-specific outputs. This includes the complexity, timing, and variations in procedure for taking differential and if required flow measurements, as well as the storage of key readings for future reference and possible use in life tracing of valve-element performance and/or levels of operation. An example of this would be the life tracking of check-valve differential pressures, which are known empirically to decline with element usage and time. Such strategic tracking of a differential pressure value could allow the controller to warn of impending valve-element failure, also tracking of the value could allow the determination of valve-element opening points which could be reported in response to a decline in the readings stored over an extended time-interval.

In support of better assessment of valves and operating conditions, an absolute pressure sensor 10 and a relief solenoid 12 (normally closed), provide options for use in the controller 11 logic to better assess conditions, and provide alarm on a wider range of criteria. One example is the use of the absolute pressure sensor 10 to monitor supply pressure, and to raise an alarm when the pressure is unusually low or high.

Figure 4:
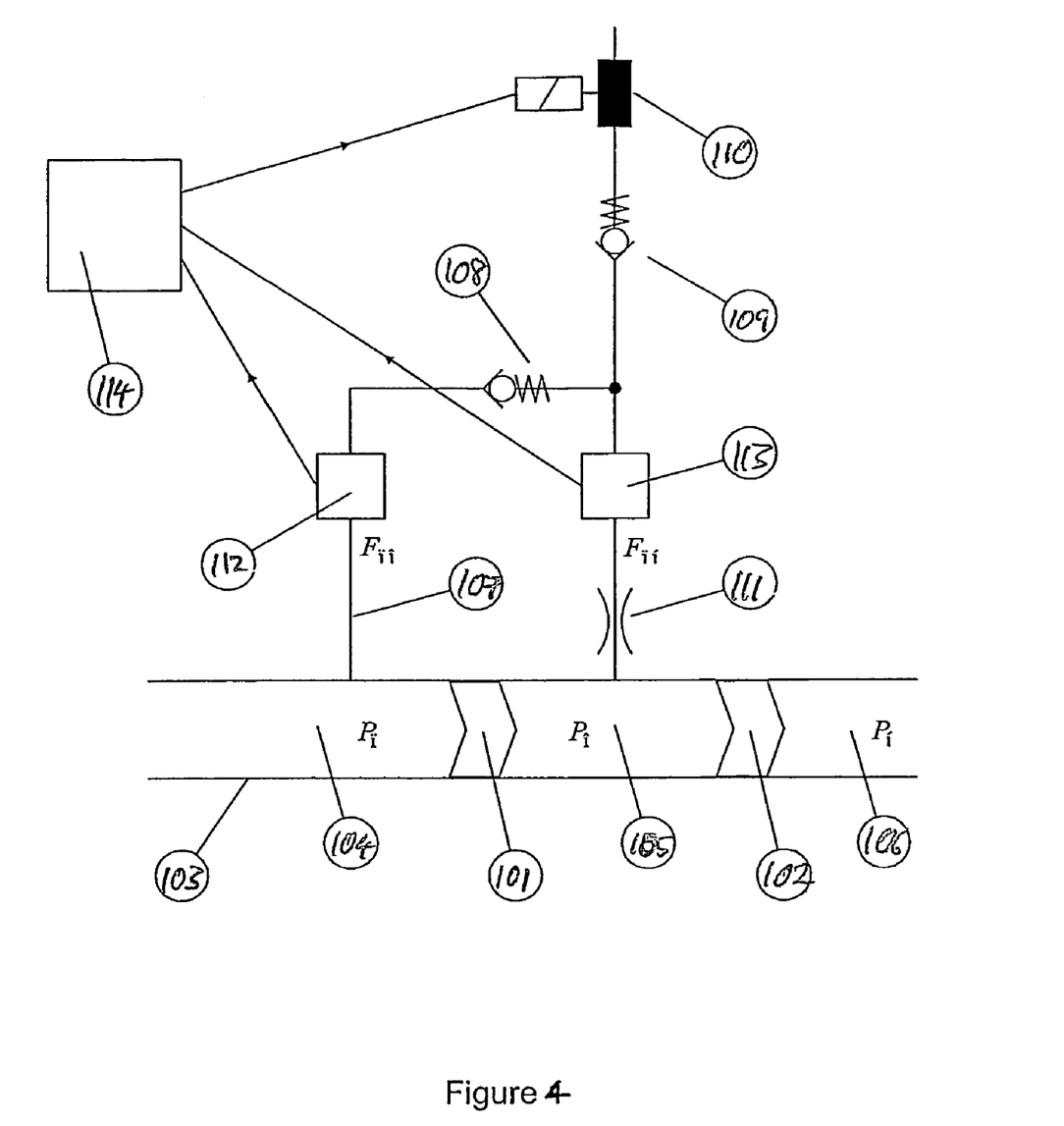
FIG. 4 is a diagrammatic representation of a further embodiment of the invention which relates specifically to backflow valve monitoring.
Figure 5:
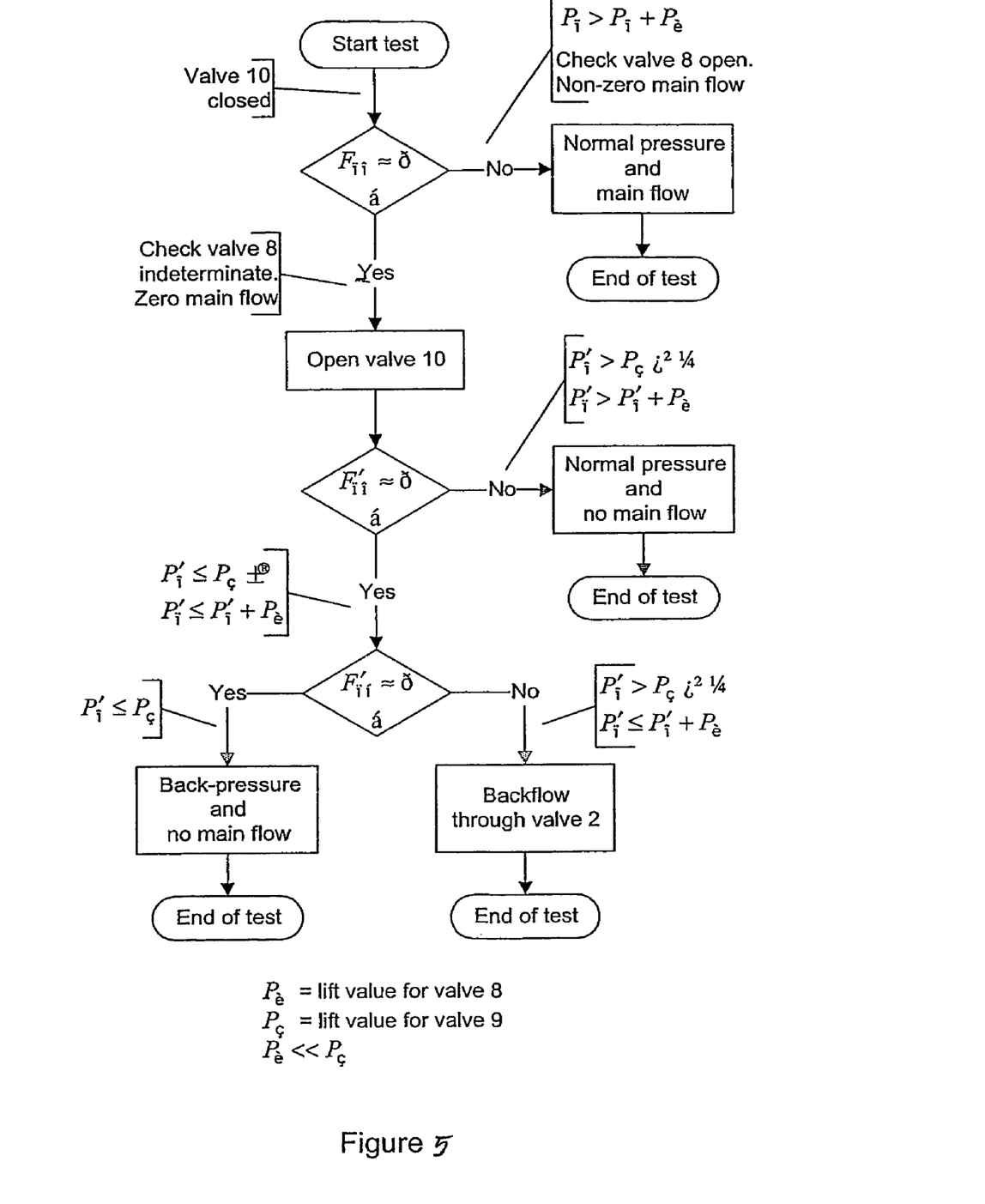
FIG. 5 is a flowchart representing a monitoring procedure in accordance with the arrangement of FIG. 4.

Referring now to FIGS. 4 and 5, these figures represent a hydraulic system and a monitoring apparatus in accordance with the invention. The hydraulic system includes a main pipe 103 divided into three regions by means of check-valves 101 and 102 which constitute a backflow valve. These regions are the upstream or inlet region 104, the intermediate region or chamber 105, and the downstream or outlet region 106.

Pressures in the three regions are denoted by $P_1$, $P_2$ and $P_3$, as shown in FIG. 4. It is helpful to have in mind some representative values for these pressures. Under normal conditions of flow, with fluid passing from the left to right, the values of pressure might be 100 psi in the upstream region, 94 psi in the intermediate region and 92 psi in the downstream region, so each check-valve has a pressure-drop of about 5 to 2 psi. These pressures and pressure-differences, referred to as the normal values subsequently, are used for illustrative purposes and should not be regarded as definitive.

A bypass line 107 is connected to ports in the upstream and intermediate regions of the pipe. A check valve 108, having a small lift rating $P_8$ such as 1 psi (6.9 kPa), and less than that of check-valve 101, prevents backflow through the bypass line 107. It will be apparent that, under the normal conditions mentioned earlier, check valve 108 will remain closed in the absence of flow, and open when flow is present in the main check-valve.

The bypass line can be drained to atmosphere through a check valve 109 and a normally-closed solenoid-operated valve 110. Check valve 109 has a lift rating $P_9$, substantially higher than that of valve 108, but lower than the normal pressure in the three regions of the main pipe. A lift rating of 20 psi (138 kPa) can be assumed for purposes of explanation.

Flow sensors 112 and 113 allow flow in the bypass line to be measured on both sides of check valve 108.

A flow-restrictor 111 is placed in the bypass line, near the intermediate chamber. The restrictor is adjusted to impede flow to about the same extent as check valve 108 when the solenoid valve is open and the pressures $P_1$ and $P_2$ have their normal values. Under these circumstances the flows $F'_{12}$ and $F'_{13}$ measured by sensors 112 and 113 would be approximately equal when solenoid 110 is opened and fluid is flowing to the atmosphere.

A controller 114 (a microcontroller, processor or similar logical machine) controls the solenoid valve and compares the flow-sensor outputs with reference values of flow. $F'_{12}$ detected by sensor 112 is non-zero, both bypass check-valve 108 and drain check-valve 109 must be open, implying that the differential pressure $P'_1-P'_2$ due to flow through check-valve 101 exceeds $P_8$ and that the pressure $P'_2$ in the intermediate chamber 105 exceeds $P_9$. A non-zero $F'_{12}$ is the expected result, from which it can be concluded that the pressures are normal, and that the main flow through check-valve 101 was almost zero before solenoid valve 110 was opened. Valve 110 is restored to its normal, closed state, and the test is completed and valve operation is considered acceptable.

If $F'_{12}$ is zero, it must be because either bypass check valve 108 or drain check-valve 109 is closed. If valve 108 is closed, the differential pressure across check-valve 101 must be less than the lift value of valve 108. If valve 109 is closed, the pressure in the intermediate chamber 105 must be less than the lift value of valve 109. These possibilities are distinguished by a further test, measurement of the flow $F'_{13}$ in sensor 113.

If $F'_{13}$ is zero, the pressure $P'_2$ in the intermediate chamber is less than $P'_9$. This implies that main supply pressure has been lost or severely reduced, so valve 110 is closed and an alarm is signalled.

If $F'_{13}$ is non-zero, and $F'_{12}$ has already been shown to be zero, valve 108 is closed and valve 109 is open, implying that there is little or no flow through check-valve 101, but there is reverse flow through check-valve 102. This is a fault condition, so valve 110 is closed and an alarm is signalled.

In the following explanation, a zero flow is to be taken as meaning a negligible detected level of flow, taking account of possible offsets and drifts in the flow sensors. Either the flow sensor or the controller incorporates a threshold setting or numerical criterion that distinguishes between flow and non-flow conditions. Differential pressures across check valves 108 and 109 are regarded as signed values, with position pressure in the direction which would tend to open the valve. Differential pressures across valve elements 101 and 102 in the main pipe are taken to be positive when the inlet side of either element is at higher pressure than the outlet side-that is, when the element is causing a pressure-drop in the direction of normal flow. Pressures are expressed as values with respect to atmospheric pressure: that is as gauge pressures. Note that primed quantities, such as $F'_{12}$ and $P'_1$, represent flow and pressure values measured after solenoid valve 110 has been opened, whereas unprimed quantities are for normal conditions, with valve 110 closed.

The operation of the invention can be understood as follows, making reference to the flow-chart in FIG. 2. With solenoid valve 110 closed, the flow $F_{12}$ in sensor 112 is measured to determine whether it is zero. If $F_{12}$ is non-zero, the differential pressure across check-valve 101 exceeds $P_8$ and the main flow through it is non-zero. In other words, normal flow conditions exist in check-valves 101 and 102, and the test is completed and successful.

If $F_{12}$ is zero, there is almost zero flow in check-valve 101, or the differential pressure across check-valve 1 is less than that across valve 108, and further monitoring is required.

The controller opens solenoid valve 110, permitting flow to occur through the bypass line 107, potentially from both the inlet and intermediate regions of the main pipe. The outlet from solenoid valve 110 is to a drain at atmospheric pressure. If the flow $F_{12}$ detected by sensor 112 is non-zero, both bypass check-valve 108 and drain check-valve 109 must be open, implying that the differential pressure $P'_1 - P'_2$ due to flow through check-valve 101 exceeds $P_8$ and that the pressure $P'_2$ in the intermediate chamber 105 exceeds $P_9$. A non-zero $F'_{12}$ is the expected result, from which it can be concluded that the pressure are normal, and that the main flow through check-valve 101 was almost zero before solenoid valve 110 was opened. Valve 110 is restored to its normal, closed state, and the test is completed and valve operation is considered acceptable.

If $F'_{12}$ is zero, it must be because either bypass check valve 108 or drain check-valve 109 is closed. If valve 108 is closed, the differential pressure across check-valve 101 must be less than the lift value of valve 109. These possibilities are distinguished by a further test, measurement of flow $F'_{13}$ in sensor. 113.

If $F'_{13}$ is zero, the pressure $P_2$ in the intermediate chamber is less than $P_9$. This implies that main supply pressure has been lost or severely reduced, so valve 110 is closed and an alarm is signalled.

If $F'_{13}$ is non-zero, and $F'_{12}$ has already been shown to be zero, valve 108 is closed and valve 109 is open, implying that there is little or no flow through check-valve 101, but there is reverse flow through check-valve 102. This is a fault condition, so valve 110 is closed and an alarm is signalled.

What is claimed is:

1. A method of monitoring for acceptable operation of a valve, said method comprising:
    employing means to establish whether upstream pressure of the valve differs from the downstream pressure by a required pressure differential and forwarding a pressure differential reading to a processor,
    whereby if the upstream pressure differs from the downstream pressure by the required pressure differential, the valve is deemed to be operating acceptably and further monitoring is terminated,
    whereby if the upstream pressure differs from the downstream pressure by an amount other than the required differential, the processor initiates further monitoring, the further monitoring comprising sensing fluid flow relative to required flow parameters and forwarding a flow reading to a processor,
    whereby if sensed flow is acceptable relative to the required flow parameters, the valve is deemed to be operating acceptably,
    whereby if sensed flow is unacceptable relative to the required flow parameters, the valve is deemed to be operating unacceptably and the processor initiates a valve failure signal.

2. A method according to claim 1, wherein the required pressure differential is a differential in which the upstream pressure is greater than the downstream pressure.

3. A method according to claim 2, wherein the upstream pressure is greater than the downstream pressure by an amount greater than the lift pressure in a one-way valve positioned in a bypass line which is in fluid pressure communication with the upstream and downstream sides of the valve being tested.

4. A method according to claim 3, wherein the lift pressure is about 1 psi (6.9 kPa).

5. A method according to claim 1, wherein the required flow parameters include: sensing whether there is fluid flow upstream of the valve being tested.

6. A method according to claim 5, wherein if fluid flow is sensed the processor initiates a valve failure signal.

7. A method according to claim 5, wherein if fluid flow is not sensed, the processor initiates further flow sensing after a predetermined delay.

8. A method according to claim 1, wherein when the valve being tested is in normal working operation said monitoring is carried out at regular intervals.

9. A method according to claim 8, wherein a test is carried out at least daily.

10. A method according to claim 9 wherein a test is carried out a plurality of times each day.

11. A method according to claim 10, wherein a test is carried out at least hourly.

12. A method according to claim 11, wherein a test is carried out at least each minute.

13. A method according to claim 1, wherein said processor communicates with a remote computer and whereby the computer is operable to receive and action any valve failure signals initiated by the processor.

14. A method according to claim 13, wherein the required pressure differential is a differential in which the upstream pressure is greater than the downstream pressure.

15. A method according to claim 13, wherein the required flow parameters include: sensing whether there is fluid flow upstream of the valve being tested.

16. A method according to claim 1, wherein a valve failure signal comprises an audio or visual alarm at or in the vicinity of the valve being tested.

17. A method according to claim 1, further including a function to calibrate the means establishing the difference between the upstream and downstream pressures, by exposing the means to equal upstream and downstream pressure.

18. A method for monitoring for acceptable operation of a valve, the method comprising:
    measuring pressure differential across a valve,
    comparing the measured pressure differential with an acceptable pressure differential,
    whereby if the measured pressure differential is acceptable relative to the acceptable pressure differential, the valve is deemed to be operating acceptably and further monitoring is terminated,
    whereby if the measured pressure differential is unacceptable relative to the acceptable pressure differential, further monitoring is completed, the further monitoring comprising:
    sensing actual fluid flow between one or both of upstream and downstream sides of the valve and comparing that flow to acceptable flow parameters,
    whereby if the actual flow is acceptable relative to the acceptable flow parameters the valve is deemed to be operating acceptably and further monitoring is terminated,
    whereby if the actual flow is unacceptable relative to the acceptable flow parameters, the valve is deemed to be operating unacceptably and a failure signal is produced.

19. Apparatus for monitoring for acceptable operation of a valve, said apparatus comprising:

pressure measuring means suitable to measure pressure differential between upstream and downstream sides of a valve being tested, flow sensing means for sensing flow of fluid relative to the valve being tested, processing means for receiving and processing data from the pressure measuring means and the flow sensing means, said processing means first comparing said pressure data relative to a required differential pressure and where the measured pressure differential differs from the required differential, the processor initiates further monitoring by said flow sensing means, in said further monitoring, said processing means comparing said flow data to required flow parameters and where the sensed flow differs from the required flow parameters, said processing means initiates a valve failure signal.

\* \* \* \* \*